United States Patent [19]

Sulzer

[11] 4,286,693
[45] Sep. 1, 1981

[54] MECHANICAL SNUBBER

[75] Inventor: Harry E. Sulzer, Telford, Pa.

[73] Assignee: Anchor/Darling Industries, Inc., Bala Cynwyd, Pa.

[21] Appl. No.: 10,621

[22] Filed: Feb. 9, 1979

[51] Int. Cl.³ .............................................. F16D 63/00
[52] U.S. Cl. ..................................... 188/378; 52/167;
74/1.5; 74/577 R; 188/134; 248/562; 368/125;
368/127
[58] Field of Search ............... 188/272, 266, 279, 280,
188/180, 1 B, 134, 130; 248/562, 564, 566;
52/167; 368/124, 125, 127; 235/135; 74/1.5,
577 R, 577 M; 185/5, 31, 38

[56] References Cited
U.S. PATENT DOCUMENTS

| Re. 29,221 | 5/1977 | Yang. | |
|---|---|---|---|
| 369,568 | 9/1887 | Street. | |
| 1,711,646 | 5/1929 | McGall. | |
| 1,972,971 | 9/1934 | Barenyi | 58/116 M |
| 1,995,190 | 3/1935 | Rostoker. | |
| 2,064,657 | 12/1936 | Goff. | |
| 2,475,730 | 7/1949 | Wandrey | 58/116 R |
| 2,570,170 | 10/1951 | Viti. | |
| 2,704,311 | 3/1955 | Thumim | 74/1.5 X |
| 2,892,289 | 6/1959 | Ryan | 74/1.5 X |
| 3,203,257 | 8/1965 | Geyer. | |
| 3,756,351 | 9/1973 | Sasaki | 188/1 B |
| 3,809,186 | 5/1974 | Suozzo. | |

Primary Examiner—George E. A. Halvosa

Attorney, Agent, or Firm—Dann, Dorfman, Herrell & Skillman

[57] ABSTRACT

A mechanical, seismic-shock-absorbing snubber adapted to accept extremely high impact loads that may be imposed upon it by reason of its interposition between heavy, relatively moveable structures. While permitting essentially unrestricted, slow, relative motion between the structures, such as may be caused by thermal effects (e.g., the expansion or contraction of a high pressure steam pipe yieldably attached by way of hangers or supports to a building structure as in a nuclear power plant), the snubber limits both the velocity and acceleration of relative motion between the structures such as might result from violent seismic shock or vibration. The snubber employs, as its damping mechanism, an escapement wheel, which rotates in response to relative movement of the structures between which the snubber is interposed and employs a cooperating, pivoted, pallet member of predetermined effective mass driven by the escapement wheel into oscillation. It is the oscillation of the pallet member, the rate of which is limited by the pallet member's mass and natural period of oscillation, that resricts or damps the velocity and acceleration of relative motion between the structures with which the snubber is associated. Alternatively, instead of employing an escapement wheel, a rack may be employed, with the teeth of the rack engaging hooks or pallets on the pallet member to drive the latter into oscillation as the rack is moved relative to the pallet member.

16 Claims, 12 Drawing Figures ial power generating plants to
MECHANICAL SNUBBER

BACKGROUND OF THE INVENTION

This invention relates to an improved, heavy duty, mechanical snubber, or shock absorbing strut. Such snubbers find important application in industry, and are widely employed in electric power generating plants to protect fluid carrying pipes from seismic shock, or from load transients introduced by flow variations resulting from turbine valve trip, water hammer, relief valve blow down or pump operation.

To accomodate the normal movement, such as expansion and contraction of high pressure, high temperature steam pipes, as used in nuclear power plants, where inherent temperature changes occur during operation, particularly during start-up or shut-down periods, it is customary to support such pipes from fixed structure, such as power plant walls or ceilings, by yieldable means which freely permit such movement. However, in the event of seismic or other transient shock, when the system or its support structure is subjected to vibratory motion or acceleration forces, such yieldable support means do not restrain rapid, large amplitude, relative movement between pipes and their support structure, which can result in rutpure of the pipes. To prevent such destructive movement, it is now customary to attach snubbers between the pipes and their support structure. It is the function of these snubbers to permit the relatively slow pipe movements that result from normal thermal expansion and contraction, but to offer substantial resistance (damping) to rapid changes in spacing between the pipes and the support structures.

Although the prior art discloses numerous snubbers and shock absorbers which function to damp or limit effects of sudden shock and vibration, all have features which make them unduly complex and expensive to produce, or which render them unsuited for use in power plants where they are installed in high temperature and, possibly, radiation environments. In such environments, hydraulic type snubbers have been found to be unsuitable, with the result that development has focused on snubbers that involve only mechanical mechanisms. Many of these prior mechanical snubbers employ rotatable inertial masses which are driven into rotation or rotational oscillation by seismic shock or vibration, the inertia of the inertial mass acting to restrain or damp the speed, acceleration and amplitude of movements resulting from forces applied to the snubber. However, in known prior devices of this mechanical type, the inertia effects of the inertial mass have been insufficient to provide the accurate damping or restraint desired, and it has been necessary to include auxiliary damping such as might be provided by an associated friction braking device. Often, such friction braking devices are actuated through other mechanisms, including one or more inertial masses, and involving still other moving parts such as springs and friction clutches. In addition to adding to snubber complexity and cost of manufacture, the effectiveness of friction brakes, springs and friction clutches, tends to vary with wear and environmental conditions, particularly temperature and radiation.

In contrast, the snubber of the present invention requires no friction braking devices, no springs and no friction clutches. It relies solely on the known physical constants of one or more pivoted masses, having a predetermined effective mass, which are driven into oscillatory rotation by external forces applied to the snubber.

The present invention has advantages over the snubber disclosed in the co-pending patent application of Richard A. Calabrese, Ser. No. 897,102, filed Apr. 17, 1978, and of common assignee herewith. That application is directed to a snubber in which relative axial movement between the support and load ends of a telescoping snubber is converted into rotary motion by means of a driving rack and driven worm arrangement. Rotation of the worm, caused by axial motion of the rack, effects, through the agency of a crank arrangement, oscillatory rotation of an inertial mass. Work done in accelerating, decelerating, and reversing the rotation of the inertial mass acts to resist, or damp, forces applied to the snubber.

SUMMARY OF THE INVENTION

The present invention provides a snubber of great simplicity and reliability, whose performance is determined by only a few basic design parameters. Once designed, the components of the snubber can be inexpensively manufactured and assembled. Because the damping effect of this improved snubber does not rely on such indefinite variables as are introduced by friction brakes, springs and clutches, the snubbers of the present invention can be produced in quantity to accurate design specifications and will all provide performance, under widely varying environmental conditions, that conforms very closely to the design specifications.

The structure that yields these significant advantages may employ, viewed externally, a two-section snubber geometry, one section being attached to a support structure, and the other section being secured to the pipe, or other structure, whose motion relative to the support structure must be controlled, limited or damped. In a preferred embodiment of the invention, there is secured to the first of the snubber sections a linear rack member which, in response to telescoping movements of the snubber sections, slides telescopically with respect to the second snubber section. Journalled in the second snubber section is an oscillating engagement means of a predetermined effective mass. The engagement means is preferably provided by a pallet member having a pair of engaging members or pallets, which alternately engage teeth on the rack as the rack moves axially out of or into the second snubber section, driving the pallet member into oscillation. Alternatively, the rack may drive, through an intervening gear train, a toothed escapement wheel which, in turn, drives the pallet member into oscillation. The alternating acceleration, deceleration, and reversal, i.e., oscillation, of the pallet member absorbs energy from the system, and hence acts to damp or limit the forces applied to the snubber, and thereby restrain undesired rapid movement between the support structures to which the ends of the snubber are attached. Moreover, the oscillatory effect of the pallet member mass limits acceleration and acts to place an upper limit on the velocity with which one section of the snubber moves toward or away from the other. This action results from the use of an escapement mechanism in which the effective mass of the oscillating member serves to limit the speed of the mechanism.

In place of the rack member which may be employed to drive the pallet member either directly or by way of an intervening toothed escapement wheel, as described above, the snubber of the present invention may utilize any other known devices, such as a ball-screw mechanism, for converting linear motion to rotary motion. In such an arrangement, the rotary motion of the converter is employed to drive a toothed escapement wheel, directly or by way of a speed changing gear box, and the escapement wheel, in turn, drives the pallet member into oscillation to provide the damping, limiting or restraining effect previously described.

BRIEF DESCRIPTION OF THE DRAWINGS

FIG. 7 being a side elevational view of the snubber, partly broken away; and FIG. 8 being a cross-sectional view, on an enlarged scale, taken along line 8—8 of FIG. 7;

FIG. 10 being a cross-sectional view of the snubber taken along line 10—10 of FIG. 9;

DETAILED DESCRIPTION OF THE INVENTION

Figure 1:
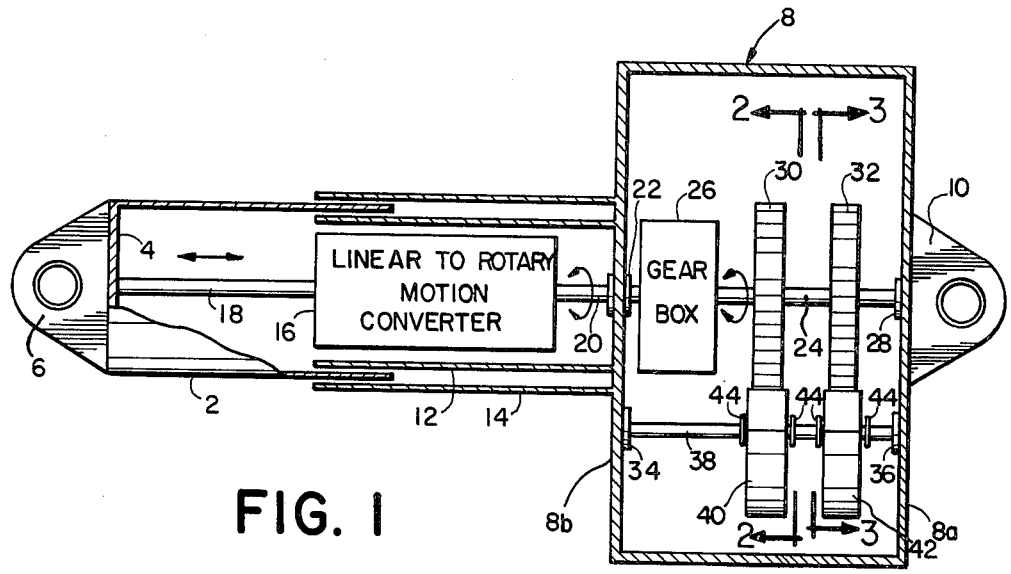
FIG. 1 is an explanatory, partially schematic, longitudinal view, partly broken away, and partly in cross-section, of a mechanical, telescoping, seismic-shock-absorbing snubber embodying the present invention.

Referring now to the explanatory embodiment of FIG. 1, the snubber there illustrated employs, when viewed externally, a basically two-section, telescoping snubber geometry. The first section of the snubber comprises a tubular member 2, which is closed at one end by end cap 4 which preferably incorporates a lug, tongue, or other suitable attachment means 6 for securing section 2 of the snubber to external structure (not shown).

The second section of the snubber comprises a housing portion 8, having an end wall 8a which incorporates a tongue, lug or other suitable attachment means 10 which may be secured to another external structure (not shown). Secured to the opposite end wall 8b of the housing 8 are a pair of spaced, concentrically mounted, tubular members 12 and 14. These tubular members are arranged telescopically to receive therebetween tubular member 2 of the other snubber section. Conventional stop means may be provided to determine or fix the limits of extension and contraction of the snubber sections 2 and 8 to keep its effective working range within desired limits.

Within the telescopically engaged parts of the snubber is a suitable device, shown schematically by rectangle 16, which may be of known type, for converting relative linear motion between snubber sections 2 and 8 (i.e., motion in the direction of the longitudinal axis of the snubber) into rotary motion of drive means, such as shaft 20. Thus, axial forces applied to lug 6 of the snubber are applied to motion converter 16 by rod 18, and the resulting axial change in the length of the snubber is converted into rotation of drive shaft 20. Rotation of shaft 20 will be in one direction for extension of the snubber, and in the opposite direction for contraction of the snubber. Shaft 20 extends into snubber housing portion 8 through a suitable bearing 22, whence it may drive shaft 24 either directly, or by way of a suitable speed-changing gear box 26. Shaft 24, which is journalled at its distal end in bearing 28, has escapement means fixed thereto in the form of a pair of toothed escapement wheels 30 and 32. See also FIGS. 2 and 3, which are sectional views taken along lines 2—2 and 3—3, respectively, of FIG. 1.

Figures 2, 3:
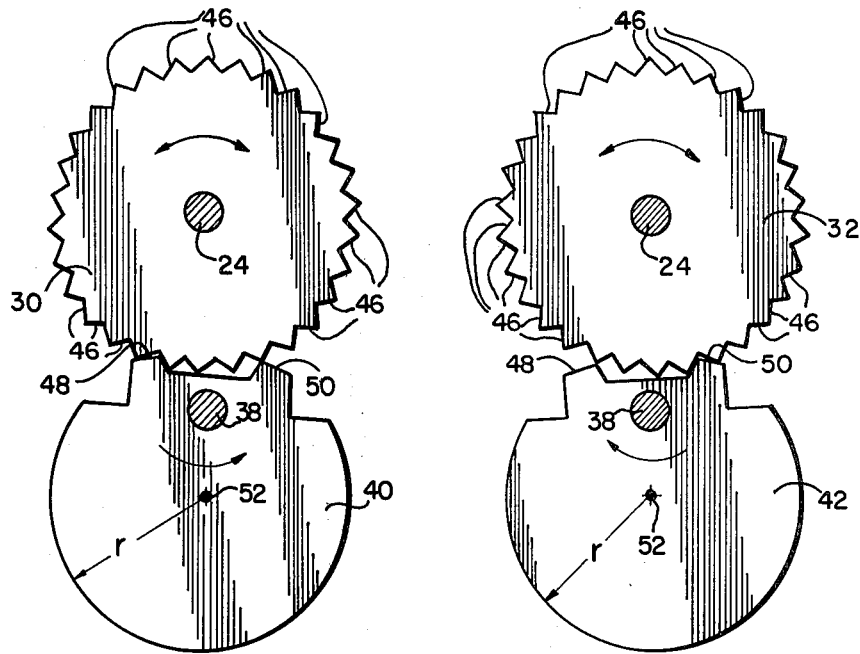
FIG. 2 is a sectional view of the snubber of FIG. 1, on an enlarged scale, taken along line 2—2.
FIG. 3 is a sectional view of the snubber of FIG. 1, on an enlarged scale, taken along line 3—3.

Also journalled in housing portion 8, in bearings or fixtures 34 and 36, is a support shaft 38 which carries engagement means, shown most clearly in FIGS. 2 and 3 as pallet members 40 and 42. The pallet members are not fixed to support shaft 38, but are free to rotate or oscillate about that shaft as a center of oscillation. Movement of the pallet members axially along the shaft is prevented by any suitable means, for example, by collars fixed to the shaft or by retaining rings 44.

An understanding of the relation of toothed escapement wheels 30 and 32, and their associated pallet members 40 and 42, is best had from examination of FIGS. 2 and 3. Referring to FIG. 2, the escapement wheel 30 is shown with its teeth 46 so engaged with engaging members or pallets 48 and 50 of engagement means or pallet member 40 that pallet member 40 has assumed its maximum clockwise rotation about shaft 38. If the escapement wheel 30 is rotated slightly in either direction from that shown in FIG. 2, pallet member 40 will be moved in the counterclockwise direction. If rotation of escapement wheel 30 is continued, pallet member 40 will be oscillated about shaft 38, from its maximum counterclockwise position back to maximum clockwise position, and so on, just as the pallet member or anchor in an anchor type escapement in a watch or clock oscillates back and forth about its axis when driven by an escapement wheel.

The escapement means or wheel 30 of the present invention, quite unlike the conventional watch or clock escapement whose escapement wheel teeth and anchor hooks are assymetrical and designed for operation in only one direction of rotation of the escapement wheel, has teeth 46 on the escapement wheel 30 which are symmetrical about a radius drawn from the center of shaft 24 to the point of any one of the teeth 46. While the invention is not limited to any specific escapement wheel configuration, the apex angle between the surfaces defining a given tooth may preferably be on the order of 90°. Similarly, the escapement wheel tooth engaging surfaces of each pallet 48 and 50 should be so related to the escapement wheel teeth that the pallet members 40 and 42 respond equally to clockwise and counterclockwise rotation of the escapement wheel. Again, while the invention is not so limited, the angle between the surfaces providing the engaging portion of each of the pallets 48 and 50 will ordinarily be greater than 90°, and may preferably have an angle on the order of about 97° which has provided significant results.

Figure 4:
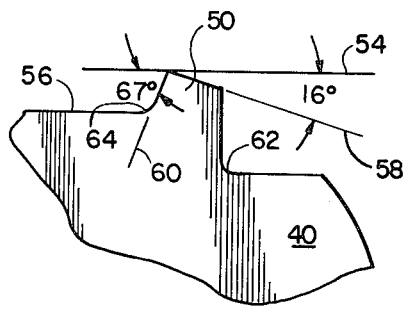
FIG. 4 illustrates, on an enlarged scale, certain details of the hook or pallet design of the pallet member of FIG. 2.

To ensure that oscillatory movement of the pallet members is induced by both clockwise and counterclockwise rotation of the escapement wheel, attention must be given to the geometry of the escapement wheel teeth and of the pallets 48 and 50 carried by the pallet members 40 and 42. As previously noted, the angle between the surfaces defining an escapement wheel tooth may be of the order of 90°. These surfaces should meet, at the tooth apex, in a sharp point, as suggested in FIGS. 2 and 3. To better understand the geometry of the pallets, reference may be had to FIG. 4 which illustrates, on an enlarged scale, a preferred design arrangement. FIG. 4 shows a pallet 50 of one of the two pallet members. The other pallet 48 would be the same, but in reverse. In FIG. 4, line 54 is a reference line that has been drawn parallel to surface 56, the pallet member surface intervening the two pallets 48 and 50.

Where the pallet member is designed to function in combination with an escapement wheel tooth apex angle of 90°, as suggested above, the angle between reference line 54 and line 58, representing the flat upper surface of pallet 50 extended, may preferably be on the order of 16°. Similarly, the angle between reference line 54 and reference line 60, representing the flat inner surface of pallet 50 extended, may preferably be on the order of 67°. The angles given were used in a snubber employing an escapement wheel having a diameter of two inches and provided with thirty 90°-degree teeth. That escapement wheel cooperated with a pendulum-type pallet member of the type illustrated in FIG. 2 having a pallet member (see FIG. 2) whose radius "r" was one inch. Pallets 48 and 50 spanned approximately three and one-half escapement wheel teeth, as indicated more precisely in FIG. 2. In that embodiment, and with pallet 48 in contact with a tooth 46 of the escapement wheel as illustrated in FIG. 2, the clearance between the apex of pallet 50 and the apex of the adjacent escapement wheel tooth was of the order on 0.005 and 0.010 inch. Such clearance also applies to FIG. 3. It should be appreciated that the pallet configuration of the pallet member will vary with the distance between the pivot point of the pallet member and the escapement wheel, and also with the number of escapement wheel teeth encompassed between pallets.

The pallet members illustrated in the embodiment in FIGS. 1, 2 and 3, are of the eccentric mass type, in that the center of mass (designated 52 in FIGS. 2 and 3) of the pallet members is radially remote from the pallet members' center of oscillation, i.e., is radially remote from the axis of pallet shaft 38.

While the relation between escapement wheel 30 and pallet member 40 may be identical to that between escapement wheel 32 and pallet member 42, so that the escapement wheels 30 and 32 drive pallet members 40 and 42 in precise synchronism, the pallet members in the embodiment illustrated in FIGS. 1, 2 and 3 are driven by the escapement wheels to oscillate in a 180° out-of-phase relation. This can be seen by comparing FIGS. 2 and 3, and is accomplished by advancing escapement wheel 30 by one-half tooth with respect to escapement wheel 32 on common shaft 24. If it is desired to have the pallet members move in phase quadrature (i.e., with a phase difference of 90°), one escapement wheel would be advanced by one-quarter tooth only with respect to the other escapement wheel.

By employing more pallet members, say four, it is possible to have pallet members moving in staggered time phase, for example, 90°, 180°, 270°, and 360°, so as to further smooth out the reaction of the four pallet members on escapement wheel shaft 24, and hence on the snubber and on the system in which the snubber is employed. Often, this smoothing out effect is of little practical importance, and in many applications it has been found that use of a single pallet member will yield results that are about equivalent to a pair of time-phased pallet members each of half the thickness.

Figure 5:
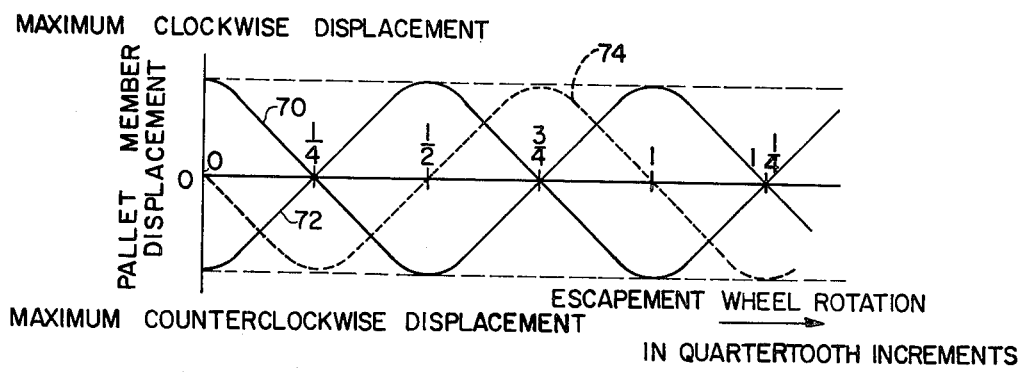
FIG. 5 is an explanatory graph that illustrates the motion of the oscillating pallet members of FIGS. 1, 2 and 3.

A better understanding of the oscillatory motion of the pallet members, and the use of synchronously driven and asynchronously driven pallet members, can be gained from an examination of the graphs of FIG. 5. In FIG. 5, there is illustrated pallet member motion, with pallet member displacement to either side of the zero displacement position as a function of time, or more particularly, escapement wheel rotation. The latter is marked off on the horizontal axis in quarter-tooth increments. Depending upon the geometry of the escapement wheel teeth and the pallets, the motion of the pallet member will approach that of a sine wave. However, because the pallet member is constrained, by its essentially backlash-free relation with the escapement wheel, to a substantially fixed amplitude, regardless of the driving force, its motion is not that of a pure sine wave.

Curve 70 of the graph of FIG. 5 illustrates, in a general way, the motion of pallet member 40 of FIG. 2. It starts (at time zero on the horizontal scale) at is maximum clockwise displacement. One-quarter tooth later, in terms of escapement wheel displacement, the pallet member reaches its zero displacement position, and then another quarter tooth later the pallet member reaches its maximum counterclockwise displacement, and so on.

In FIG. 3, the escapement wheel 32 is shown as displaced by one-half tooth from escapement wheel 30 of FIG. 2, and the displacement of the other pallet member 42 is illustrated by curve 72, FIG. 5, as starting at its maximum counterclockwise position (at time zero on the horizontal scale). One quarter tooth later, in terms of escapement wheel displacement, the pallet member reaches its zero displacement position, and then another quarter tooth later the pallet member reaches its maximum clockwise displacement, and so on. It will be observed that curves 70 and 72 are 180° out of phase, and these curves thus are illustrative of the out-of-phase motion of the pallet members of the snubber described with reference to FIGS. 1-4.

As noted earlier, instead of the 180° degree phase displacement described above, the pallet members may be driven in phase quadrature, i.e., in a 90° out-of-phase relation. Dashed curve 74 is illustrative of the motion of a pallet member which is in phase quadrature to the pallet members whose motion is represented by curves 70 and 72. Such phase quadrature relation may be had by displacing one escapement wheel from the other by one-quarter tooth.

Since most snubbers are used in heavy duty applications where the actuation may be severe, snubber parts which are subjected to shock, vibration and wear are normally made of hardened steels, preferably hardened stainless steel. Those parts that are subject to particularly high shock forces, high contact pressures and friction, such as the escapement wheel teeth and pallets, are preferably surface treated to increase surface hardness. Various means for accomplishing this are well-known in the art. Applicant has used the "Electrolizing Process" a well-known proprietary process that yields a Rockwell C hardness value of 70-72. Such surface treatment offers high wear resistance, very low coefficient of friction, excellent anti-seizure properties, and high corrosion resistance.

Figure 6:
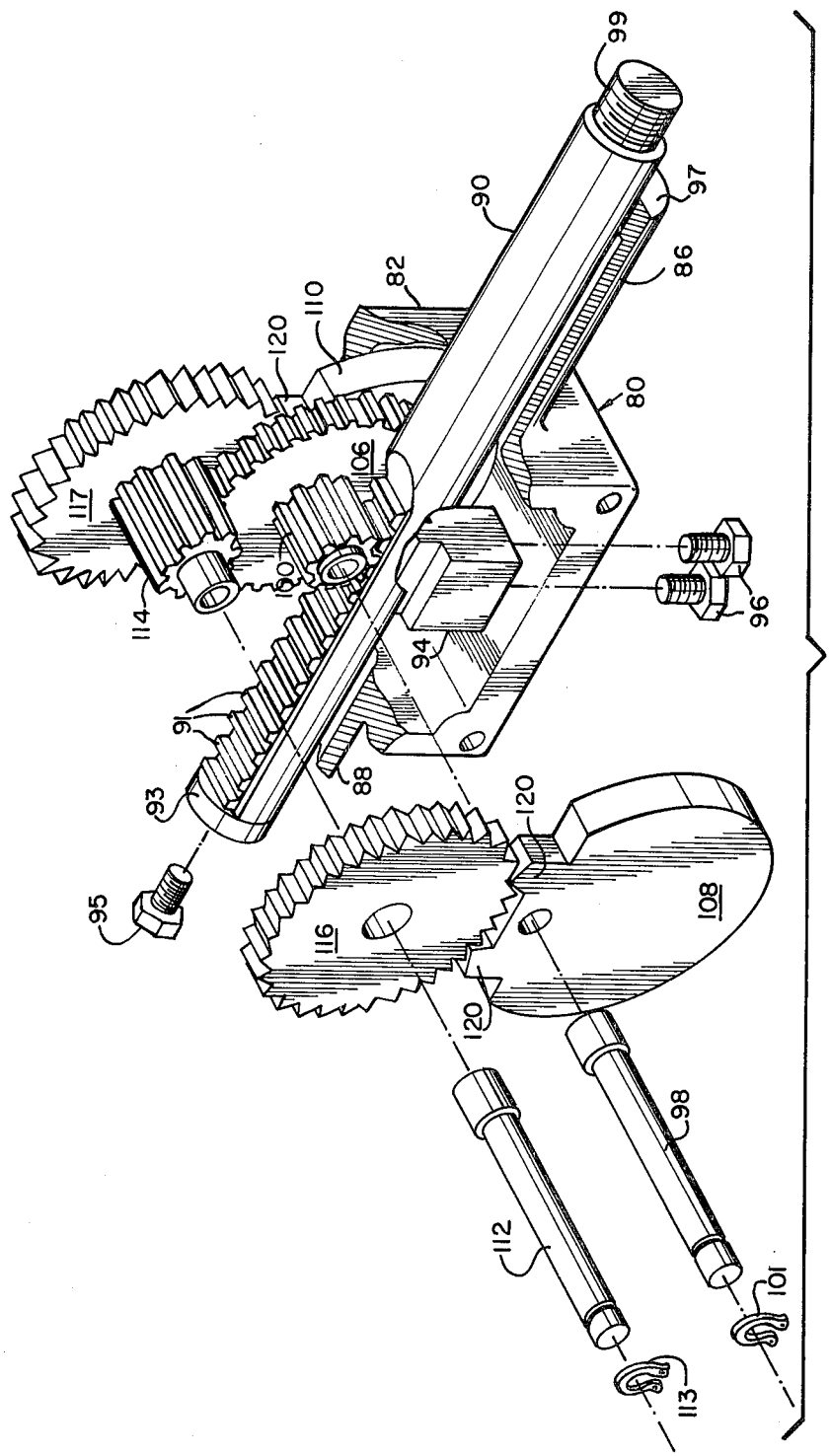
FIGS. 6, 7 and 8 illustrate a preferred embodiment of a snubber embodying the invention, FIG. 6 being a perspective, partly exploded, view of the snubber.
Figure 7:
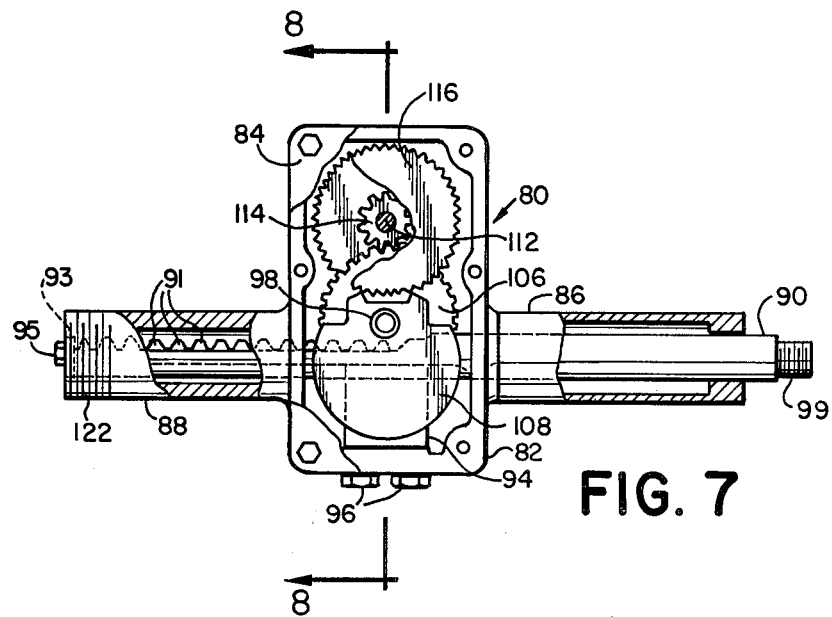
Figure 8:
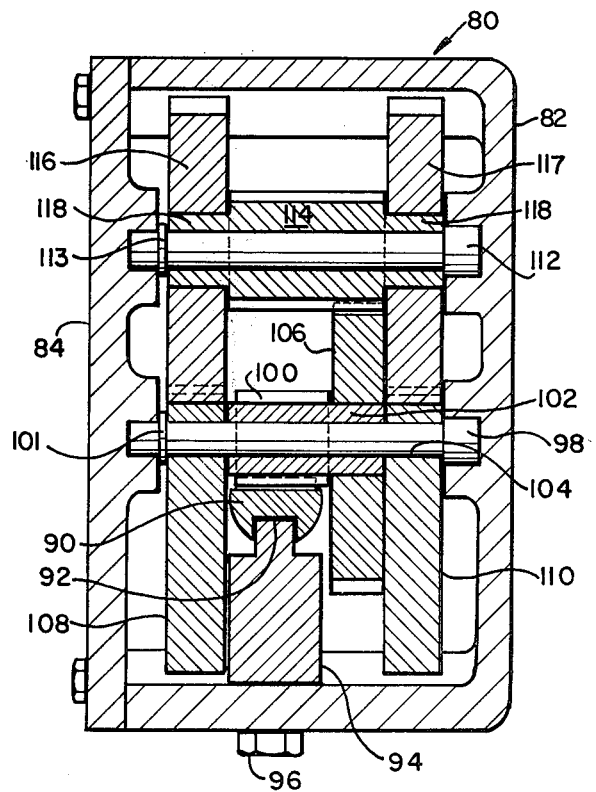

Referring now to FIGS. 6, 7 and 8, which illustrate a preferred embodiment of the invention, FIG. 7 is a side elevational view of the snubber, partly broken away, while FIG. 8 is a cross-sectional view taken along the line of 8—8 of FIG. 7. An understanding of the operation of this embodiment will be facilitated by reference to the perspective, fragmentary, partly exploded view of the snubber in FIG. 6. This snubber is provided with a housing, generally designated 80, having a main housing portion 82, a housing cap or cover plate 84, a front guide sleeve 86, and a rear sleeve 88.

Telescopically engaged with housing 80, and particularly with front and rear guide sleeves 86 and 88 is a rack member 90 having a set of upwardly-extending rack teeth 91. The rack may be machined from stock of circular cross-section, and may be provided on its underside, i.e., the side opposite the teeth, with a keyway 92 (see FIG. 8) that cooperates with rack guide 94. The latter serves to maintain alignment of the rack in the snubber housing. Rack guide 94 may be secured, as by screws 96, to the bottom of the main housing body 82.

The snubber may be provided with stop means that limit the telescopic travel of rack 90 in housing 80 to ensure that the toothed section of the rack will not travel in either direction, past pinion 100 (to be described hereinafter) with which rack 90 is engaged. As best seen in FIG. 6, travel of the rack to the right is limited by provision of a disk or stop 93 which is fixed to the toothed end of the rack 90 by means of screw 95. Stop 93 serves to close the left-hand end of rack keyway 92 and stops movement of rack 90 to the right (as viewed in FIG. 6) when stop 93 engages rack guide 94. Travel of rack 90 to the left, as viewed in FIG. 6, is limited by engagement of end surface 97 of front guide sleeve 86 with a suitable external fixture (not shown) attached to rack 90 by means of threading 99 on rack 90. Such threading may also be employed to attach the rack to one of the two structures (e.g., building structure or high pressure steam piping) with which the snubber is to be associated.

Journalled in main housing body 82 and cover plate 84 by means of bearing shaft 98 is a pinion gear 100 whose teeth engage teeth 91 of rack 90. Pinion 100 includes an axially extending hub 102, seen in FIG. 8, that engages, by force fit, a central opening 104 (see FIG. 8) in gear 106. The association of pinion 100 and gear 106 is such that pinion and gear rotate as a unit when pinion 100 is driven into rotation by axial movement of rack 90 in housing 80. This may be accomplished not only by the provision of force fit between pinion 100 and gear 106 but also by the provision of known key means between the hub 102 of pinion 100 and gear 106, such as, for example, a Dutchman pin. Pinion 100 and gear 106 are, however, free to rotate with respect to bearing shaft 98. Also carried by bearing shaft 98, and free to rotate thereon, are pallet members 108 and 110, to be discussed hereinafter. A snap ring 101 completes the sub-assembly comprising bearing shaft 98, pallet members 108 and 110, gear 106 and pinion 100. A similar snap ring 113 is engaged with bearing shaft 112, described below. As best seen in FIG. 8, bearing shaft 98 is journalled at it ends in suitable cavities formed in main housing body 82 and in cover plate 84.

Also journalled in suitable cavities formed in the main housing body 82 and cover plate 84 by means of the second bearing shaft 112, are a second pinion 114 and a pair of toothed escapement wheels 116 and 117. The escapement wheels are force fitted to axially extending hubs 118 of pinion 114 to preclude relative rotation therebetween, so that rotation of pinion 114 will cause like rotation of the escapement wheels 116 and 117. In addition to the force fit between the hubs of pinion 114 and the escapement wheels 116 and 117, suitable key means may be provided, such as Dutchman pins (not shown) to ensure that no slippage occur between pinion 114 and escapement wheels 116 and 117.

Pallets 120 on pallet members 108 and 110 (see especially FIGS. 6 and 7) engage the teeth of escapement wheels 116 and 117, respectively, in a manner previously described with reference to FIGS. 1 through 4. The pallet members may be driven in phase, 180° out of phase, or in phase quadrature, or in any other desired phase relation, as described with reference to FIG. 2, 3 and 5. In use, the snubber of FIGS. 6, 7 and 8 is interposed between external structures by appropriate securing means provided on the snubber. For example, the rear sleeve 88 might be attached to building structure by means of threading 122, while the telescoping rack member 90 may be attached to high-pressure steam piping by means of threading 99. The snubber of FIGS. 6, 7 and 8 is essentially a variation of the snubber of FIG. 1, in which the linear to rotary motion converter comprises the rack member 90 and cooperating pinion 100, the rack 90 and pinion 100 serving to convert the linear or telescoping motion of rack 90 into rotary motion of pinion 100 and gear 106. Gear 106 and pinion 114 serve as a step-up gear box (equivalent to the gear box 26 of FIG. 1) and thus greatly increase the rotational speed of escapement wheels 116 and 117 relative to the rotational speed of pinion 100. As has already been noted in detail with reference to the snubber of FIGS. 1, 2 and 3, escapement wheels 116 and 117 drive pallet members 108 and 110, respectively, into oscillatory rotation. Furthermore, the oscillatory effect of these high-mass pallet members, and their resistance to being driven at speeds exceeding their natural frequency of oscillation, tends to set a limit on the movement of the escapement wheels equally in either direction to limit the speed or velocity and acceleration with which the rack member 90 can be moved relative to snubber housing section 80.

Figure 9:
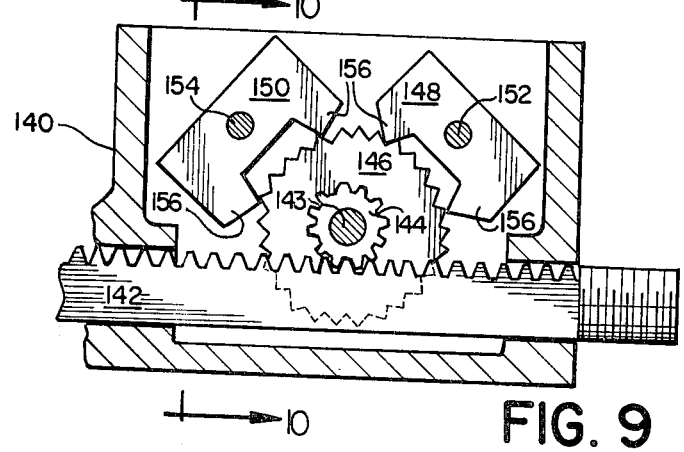
FIGS. 9 and 10 illustrate a further embodiment of the invention, FIG. 9 being a fragmentary, side elevational view of one of the snubber's two escapement wheels driving a pair of associated pallet members.
Figure 10:
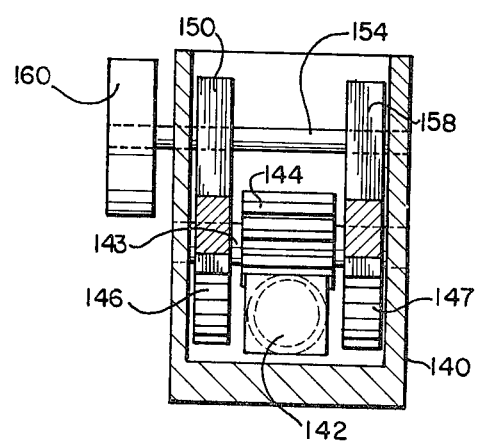

Referring now to the alternative form of snubber illustrated in FIGS. 9 and 10, FIG. 9 is a fragmentary, side elevation view, partly in section, of a snubber employing a pair of escapement wheels, each escapement wheel cooperating with and driving a pair of pallet members. FIG. 10 is a cross-sectional view of the snubber of FIG. 9 taken along the line 10—10. Since the housing for the snubber of FIGS. 9 and 10 may be generally similar to that described with reference to FIGS. 6, 7 and 8, the housing 140 is shown only in fragmentary section. As in the case of the snubber of FIGS. 6, 7 and 8, the snubber of FIGS. 9 and 10 employs a linear rack member 142 which is telescopically engaged with housing 140. Journalled in the housing 140, and in the front cover thereof (not shown), by means of a shaft 143 is pinion gear 144 which is driven into rotation by rack 142. The combination of rack 142 and pinion 144 thus constitute a simple linear-to-rotary motion converter. Keyed to shaft 143, and thus also to pinion 144, is an escapement wheel 146, having a plurality of teeth similar to those already described with reference to FIGS. 2 and 3. Also journalled in snubber housing 140 by means of bearing shafts 152 and 154 are a pair of cooperating pallet members 148 and 150. Pallets 156 on pallet members 148 and 150 may have characteristics similar to those which have already been described with reference to FIGS. 2, 3 and 4. However, unlike the eccentrically pivoted pallet members 40 and 42 described with reference to the snubber of FIGS. 1, 2 and 3, the pallet members 148 and 150 may pivot about their respective centers of gravity.

Because the fragmentary, cross-sectional view of FIG. 9 shows only two of the snubber's four pallet members, FIG. 10 shows more clearly how a pair of pallet members 150 and 158 (not visible in the view of FIG. 9) may be mounted on a single bearing shaft 154. Where it is desired to increase the effective mass of the pallet members 150 and 158, without increasing the size of the pallet members themselves, an external mass 160, which may be cylindrical or eccentric in form, may be secured on bearing shaft 154, as shown in FIG. 10. In such an arrangement, at least one of the pallet members 150 and 158 should be keyed to the bearing shaft 154 so that oscillatory rotation of the pallet member will also produce oscillatory rotation of the mass 160. Where both pallet members 150 and 158 are driven in precise synchronism by the escapement wheels 146 and 147, both pallet members 150 and 158 may be keyed to bearing shaft 154.

While not illustrated in the cross-sectional view of FIG. 10, it will be understood that another pair of pallet members, carried by bearing shaft 152 also cooperate with escapement wheels 146 and 147, respectively, as pallet member 148 cooperates with escapement wheel 146, and are driven into oscillatory rotation thereby. Bearing shaft 152 may also be provided with an external mass for the purpose of increasing the effective mass of the associated pallet members are described relative to mass 160.

Figure 11:
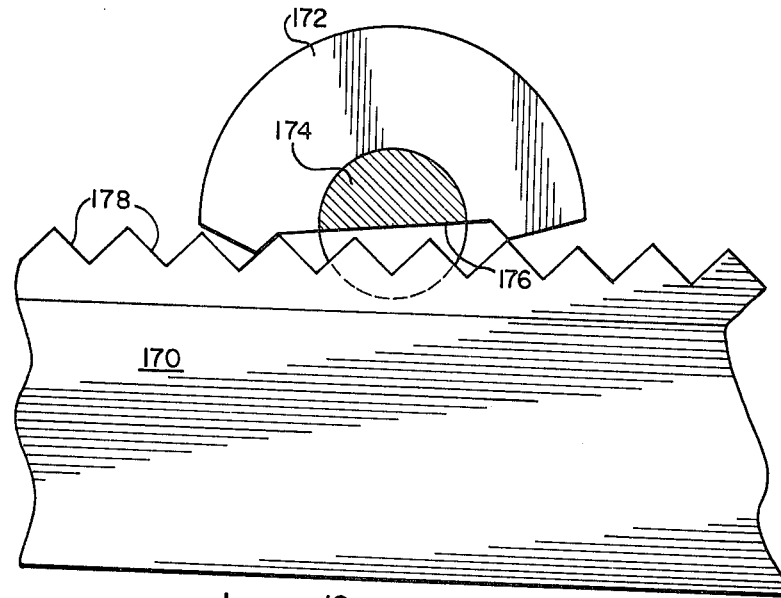
FIG. 11 is a fragmentary, side elevational view of a snubber arrangement in which the pallet member is driven into oscillation directly by teeth on the rack.

FIG. 11 is illustrative of an arrangement in which a snubber, having a housing and rack of the type illustrated in FIG. 9, may be simplified to eliminate the pinion and escapement wheel by coupling the pallet member directly to the rack. In this arrangement, the pallet member 172 may be machined integrally with its bearing shaft 174, which is journalled in a housing similar to housing 140 illustrated in FIG. 9. Integral shaft 174 must be ground or machined, as long the line 176, to preclude interference of any part of the bearing shaft with the teeth 178 of rack 170. If desired, the effective mass of the pallet member 172 may be substantially increased by fixing to bearing shaft 174 an external, concentric or eccentric mass similar to the mass 160 of FIG. 10.

In the snubber of FIG. 11, rack 170, functioning as a toothed escapement means, performs the same function as the escapement wheels of FIGS. 6, 7 and 8. Also, it should be observed that in both the embodiments of FIGS. 6, 7 and 8 and of FIG. 11, the rack and pallet members can be described as operatively coupled, in the former embodiment the coupling is indirect and through the agency of intervening gears and escapement wheels, while in the latter embodiment the coupling is direct.

Figure 12:
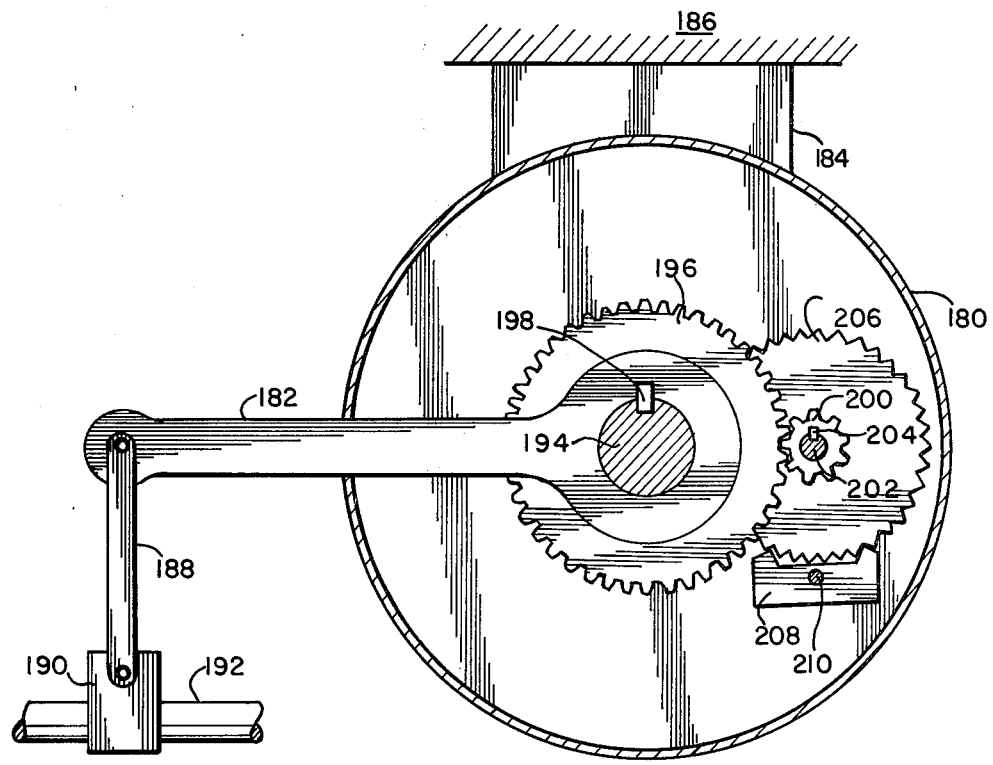
FIG. 12 shows the invention applied to a snubber of the rotary type, in contrast to the linear or telescoping type illustrated in the other figures.

All of the snubbers described with reference to the preceding figures may be referred to generally as being of the telescoping type, in that one member of the snubber telescopes into or with respect to the other. However, the invention is not limited to the telescoping type of snubber but is also adapted for use with the rotary type of snubber. Such a snubber is illustrated in FIG. 12 of the drawings. FIG. 12 shows a rotary type of snubber, embodying the invention, employing a main housing section 180 from which, for convenience of illustration, the front cover has been removed to show the parts lying between the external lever arm 182 and the back of housing 180. Housing 180 of the snubber may be attached to fixed external structure 186 by any suitable means shown generally at 184, while the outer end of lever arm 182 may be fixed to other external structure 192 by means of a clamp 190 and, if desired, by means of a connecting link 188. If the link 188 is pivoted at both its upper and lower ends, as shown in the drawing, the snubber will function to damp generally vertical motion of structure 192.

Lever arm 182 and gear 196 are carried by main bearing shaft 194, and are keyed to that shaft by key 198. A second bearing shaft 202, also journalled in housing 180, carries pinion gear 200 and escapement wheel 206. Both the pinion 200 and the escapement wheel 206 are keyed to shaft 202 by key means 204, so that rotation of gear 196 effects rotation of both pinion 200 and escapement wheel 206. Also journalled in the housing 180, by means of bearing shaft 210, is a pallet member 208 having pallets which engage the teeth of escapement wheel 206 in the manner already described with reference to FIGS. 2 and 3. Thus, rotation of the snubber's lever arm 182 about main bearing shaft 194 causes escapement wheel 206 to drive pallet member 208 into oscillatory rotation and thus, as hereinbefore described, effectively damp forces tending to cause rapid rotation, in either direction, of lever arm 182 about main bearing shaft 194.

If desired, pallet member 208 can be of the eccentric mass type described with reference to FIGS. 1, 2 and 3. Moreover, if desired, the effective mass of the pallet member 208 may be greatly increased by coupling to it a large external mass of the type described above with reference to FIG. 10.

Referring to all of the embodiments of the invention described above, the magnitude of the damping, limiting or restraining effect of the snubber is proportional to the magnitude of the effective mass of the engagement means or pallet member or members employed. It is also a function of the eccentricity of the mass of the pallet members. The damping effect of the pallet members is, of course, increased by employing pallet members whose center of mass is spaced substantially from the axis of rotation of the pallet member. Also, the damping effect of the pallet member may be increased by increasing its polar moment of inertia. Also, the damping effect of the pallet member may be further increased by increasing its rate of oscillation, which may be accomplished through a step-up gear ratio, as illustrated in FIGS. 1, 6 and 12. All of these parameters affecting the effective mass of the pallet member are readily predetermined by the snubber designer in designing snubbers for various applications and of various load capabilities.

While the invention has been described with particular reference to specific embodiments thereof in the interest of complete definitiveness, it may be embodied in a large variety of forms diverse from the ones specifically shown and described without departing from the scope and spirit of the invention as defined by the appended claims.

I claim:

1. A mechanical force responsive snubber to damp the effects of seismic or other shock and vibration comprising:
   a first snubber terminal for securing said snubber to a first external structure;
   a second snubber terminal for securing said snubber to a second external structure, said external structures being subject to relative movement, one with respect to the other;
   bi-directional toothed escapement means actuated into one of two directions of movement in response to relative movement of said first and second snubber terminals with respect to each other; and
   weighted engagement means having an axis, and having a predetermined effective mass, of the eccentric type, said engagement means being engaged with said escapement means for oscillatory rotation about said axis and being responsive to movement of said escapement means in either of the two directions for effecting the oscillatory rotation of said engagement means to have the weighted engagement means limit the movement of the escapement means equally in either of the two directions to limit the velocity and acceleration between said snubber terminals.

2. The snubber defined in claim 1, wherein said toothed escapement means is a rack with teeth and said engagement means includes a pallet member with pallets, the teeth of the rack directly engaging the pallets on said pallet member.

3. The snubber defined in claim 1, wherein said toothed escapement means is an escapement wheel having teeth, and said engagement means includes a pallet member with pallets, said pallets being engaged with the teeth of the escapement wheel.

4. The snubber defined in claim 1, wherein said snubber is of the telescoping type, the first snubber terminal being associated with a first snubber section, and the second snubber terminal being associated with a second snubber section, one of said snubber sections moving telescopically with respect to said other snubber section.

5. The snubber defined in claim 1, wherein said snubber has a lever arm associated with one snubber terminal, and a structure associated with the other snubber terminal having a rotatable shaft to which said lever arm is secured, said shaft being coupled to said escapement means for actuating said escapement means in response to rotation of said shaft.

6. A mechanical force responsive snubber to damp the effects of seismic or other shock and vibration comprising:
   a first snubber section having means for securing said first section to a first external structure;
   a second snubber section having means for securing said second section to a second external structure said external structures being subject to relative movement one with respect to the other;
   a bi-directional rack having rack teeth, said rack constituting a pair of said first snubber section;
   weighted engagement means having an axis about which said engagement means may oscillate rotationally; said engagement means being rotatably mounted in said second snubber section, said engagement means having a predetermined effective mass of the eccentric type;
   said rack and said engagement means being operatively coupled to be responsive to relative movement of said snubber sections with respect to each other to effect oscillatory rotation of said engagement means about said axis;
   said weighted engagement means with its oscillatory rotation limiting the movement of the rack equally in either of the two directions to limit the velocity and acceleration between said snubber sections.

7. A mechanical force responsive snubber to damp the effects of seismic or other shock and vibration comprising:
   a first snubber section having means for securing said first section to external structure;
   a second snubber section engaged with said first snubber section and having means for securing said second section to other external structure;
   said first and second snubber sections being responsive to relative movement of said external structure, one with respect to the other;
   motion conversion means having drive means and mechanically coupling said first and second snubber sections said motion conversion means converting one of two directions of relative linear motion between said snubber sections into corresponding rotation of said drive means in one of two directions;
   a bi-directional toothed escapement wheel driven by said drive means, said wheel being driven in one direction by relative movement of said snubber sections in one of the two directions and in the opposite direction by the other of the two directions of relative movement of said snubber sections;
   weighted engagement means having an axis, and having a predetermined effective mass of the eccentric type, said engagement means being engaged with the teeth on said escapement wheel, and being responsive to rotation of said escapement wheel in either of the two directions for effecting oscillatory rotation of said engagement means about said axis to have the weighted engagement means limit the movement of the escapement wheel equally in either of the two directions to limit the velocity and acceleration between said snubber sections.

8. A mechanical snubber as claimed in claim 7, wherein said engagement means comprises plural pallet members, said pallet members and said toothed escapement wheel being operatively coupled together such that the oscillatory rotation of at least one of said pallet members is displaced in time phase from the oscillatory rotation of another of said pallet members.

9. A mechanical force responsive snubber to damp the effects of seismic or other shock and vibration comprising:
   a first snubber section having means for securing said first section to external structure;
   a second snubber section having means for securing said second section to other external structure;
   said first and second snubber sections being responsive to relative movement of said external structure, one with respect to said other;
   a bi-directional rack member secured to said first snubber section for movement with the first snubber section, said rack member having rack teeth formed on a surface thereof;
   weighted engagement means with an engaging member, said engagement means having a predetermined effective mass of the eccentric type and having an axis about which said engagement means may oscillate, said engagement means being mounted for oscillatory movement in said second snubber section;

said engaging member of said engagement means and said rack teeth being operatively coupled together to be responsive to relative movement of said snubber sections with respect to each other to effect oscillatory movement of said engagement means about said axis;

said weighted engagement means with its oscillatory movement limiting the movement of the rack member equally in either of the two directions to limit the velocity and acceleration between said snubber sections.

10. A mechanical snubber as claimed in claim 9, wherein said rack teeth directly engage said engaging member of said engagement means.

11. A mechanical snubber as claimed in claim 9 further including a pinion engaged with said rack teeth, and a toothed escapement wheel driven by said pinion; the teeth on said escapement wheel engaging said engaging member of said engagement means.

12. A mechanical snubber as claimed in claim 9, wherein said predetermined effective mass of said engagement means comprises the mass of a pallet member together with the mass of a body coupled to said pallet member.

13. A mechanical snubber as claimed in claim 8, wherein said engagement means with an engaging member comprises plural pallet members, said pallet members and said rack teeth being operatively coupled together such that the oscillatory movement of at least one of said pallet members is displaced in time phase from the oscillatory movement of another of said pallet members.

14. A mechanical snubber as claimed in claim 9, wherein the axis about which said engagement means oscillates is at a right angle to the line of movement of the rack member.

15. A mechanical force responsive snubber to damp the effects of seismic or other shock and vibration for interposition between, and for damping the relative movement of, first and second external structures, one structure with respect to the other, said snubber comprising:

a first snubber portion having terminal means for securing said snubber to said first external structure;

a second snubber portion having terminal means for securing said snubber to said second external structure;

said first and second snubber portions being coupled and subject to relative movement in response to movement of one external structure with respect to the other;

bi-directional toothed escapement means actuated in response to said relative movement of said snubber portions;

a weighted engagement means having engaging members, an axis, and having an effective mass of the eccentric type;

said engaging members of the engagement means being engaged with said escapement means and responsive to actuation of said escapement means to cause oscillatory rotation of said engagement means about said axis to have said weighted engagement means limit the movement of said escapement means equally in either of the two directions to limit the velocity and acceleration between said first and second snubber portions;

said effective mass being predetermined in accordance with the damping to be introduced by said snubber.

16. The mechanical snubber defined in claim 15, wherein said engagement means having engaging members is a pallet member with pallets, said pallets engaging the teeth of said toothed escapement means.

* * * * *